United States Patent
Arai et al.

(10) Patent No.: US 6,252,384 B1
(45) Date of Patent: Jun. 26, 2001

(54) POWER-SUPPLY VOLTAGE FLUCTUATION INHIBITING CIRCUIT

(75) Inventors: Satoshi Arai; Hirokazu Tohya, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/544,919

(22) Filed: Apr. 7, 2000

(30) Foreign Application Priority Data

Apr. 21, 1999 (JP) .................................................. 11-113139

(51) Int. Cl.[7] ...................................................... G05F 1/56
(52) U.S. Cl. ............................................. 323/282; 323/283
(58) Field of Search ................................. 323/224, 282, 323/283, 284

(56) References Cited

U.S. PATENT DOCUMENTS

| | | | |
|---|---|---|---|
| 5,570,004 | * 10/1996 | Shibata | 323/284 X |
| 5,572,112 | * 11/1996 | Saeki et al. | 323/282 |
| 5,754,883 | 5/1998 | Lim et al. | 395/838 |
| 5,878,251 | 3/1999 | Hagiwara et al. | 395/560 |
| 5,933,649 | 8/1999 | Lim et al. | 395/750.04 |
| 5,966,003 | * 10/1999 | Takimoto et al. | 323/224 |

FOREIGN PATENT DOCUMENTS

| | | |
|---|---|---|
| 59-89525 | 5/1984 | (JP) . |
| 8-006662 | 1/1996 | (JP) . |
| 9-237130 | 9/1997 | (JP) . |

* cited by examiner

Primary Examiner—Jessica Han
(74) Attorney, Agent, or Firm—Foley & Lardner

(57) ABSTRACT

Disclosed are a circuit and method for inhibiting a fluctuation in power-supply terminal voltage of a CPU caused by a change in working current of the CPU, which is connected to a DC power supply. The circuit includes a CPU controlled between a sleep state and an operating state by the value of a stop-clock signal applied thereto from a stop-clock terminal; a transistor inserted in parallel with the CPU across power-supply terminals thereof; and a control circuit for controlling the flow of current into the transistor in dependence upon a change in the power-supply current of the CPU caused by a change in the stop-clock signal, thereby inhibiting a fluctuation in voltage across the power-supply terminals of the CPU.

18 Claims, 8 Drawing Sheets

POWER-SUPPLY VOLTAGE FLUCTUATION INHIBITING CIRCUIT

FIELD OF THE INVENTION

This invention relates to a power-supply voltage control circuit and method. More particularly, the invention relates to a circuit for inhibiting a fluctuation in the power-supply terminal voltage of a load caused by a fluctuation in working current through the load.

BACKGROUND OF THE INVENTION

The CPUs used in recent personal computers consume ever larger amounts of power owing to higher clock speeds and a greater degree of integration. For this reason, CPUs are provided with a function for conserving power by placing the CPU in a sleep mode when there is little demand for execution of processing from the system. The function that provides the sleep (or idle) mode is referred to as a "stop-clock function". In an actual personal computer, consumption of power is reduced by repeatedly alternating between the operating and sleep states.

Various techniques have been disclosed for performing the kind of control required for the stop-clock function.

By way of example, the specification of Japanese Patent Kokai Publication JP-A-9-237130 discloses a control method which includes determining the type of hardware interrupt that occurs when a CPU is in the sleep mode and forcibly restoring the CPU to the operating state depending upon the type of interrupt.

Also JP-A-8-6662 discloses a stop-clock control method which allows to place the CPU in the sleeping state when there is no input signal during a predetermined period of time and allows the user to set the state of CPU at his will.

The stop-clock function is such that when a CPU makes a transition from the sleep to the operating state as a result of this function, there is a sudden increase in the working current of the CPU. As a consequence, a voltage drop is produced as by impedance in the wiring of the power line that supplies the CPU with power, and the power-supply terminal voltage of the CPU temporarily falls below the allowable operating voltage of the CPU. This is a cause of CPU malfunction. Conversely, when the CPU undergoes a transition from the operating to the sleep state, the working current of the CPU declines sharply and the voltage across the power-supply terminals of the CPU rises.

FIG. 8 illustrates an example of the construction of a power-supply control circuit used in a conventional personal computer. Here a CPU 9, which is supplied with power from a DC power supply 1, is connected via a power-supply line 2 comprising a cable, connector and a printed circuit board, etc. The power-supply line 2 has a line impedance 4 composed of a resistance or impedance component.

The power-supply terminal voltage of the CPU 9 fluctuates when the working current of the CPU 9 fluctuates owing to the line impedance 4. In order to prevent this, a DC-DC converter 11 is disposed in the vicinity of the CPU 9 and the output side of the converter 11 is provided with a plurality of large-capacity capacitors 10 to suppress the fluctuation across the power-supply terminals of the CPU 9.

SUMMARY OF THE DISCLOSURE

However, the following problems have been encountered in the course of investigations toward the present invention. Namely, there is a drawback with the prior-art circuit shown in FIG. 8 that when package space is limited, as in the case of a portable computer (personal digital assistant PDA on portable information terminal), the DC-DC converter 11 having the large capacitors cannot be placed close to the CPU and therefore cannot be applied to a computer of this kind. The reason for this is that capacitors having a large electrostatic capacity generally are necessary to inhibit a fluctuation in the terminal voltage of a CPU. These capacitors are large in size. Moreover, unless these capacitors are placed as close as possible to the CPU, a line impedance is produced between the CPU and the capacitors. This results is diminished effectiveness.

Another publication that relates to control of the power supply of a load is the specification of Japanese Patent Kokai Publication JP-A-59-89525. This discloses a terminal device having a main unit (power supply section) and a load section connected by a cable the impedance of which is not negligible, wherein it is intended no distortion is produced in a signal transmitted between the main unit and the load even if the load fluctuates. For that purpose, a dummy load is connected in parallel with the load as a device having minimal additional circuitry. By controlling the current through the dummy load, the total of the load and dummy load currents (namely the power-supply current) is rendered substantially constant. In this case the dummy load consumes a substantial amount of power.

Accordingly, an object of the present invention is to provide a circuit and a power-supply control method for inhibiting a fluctuation in a power-supply terminal voltage caused by a fluctuation in the working current of a load, whereby the load is supplied with a stabilized power-supply voltage.

It is another object of the present invention to provide a circuit and a power-supply control method in which the above object is achieved with a reduced power consumption.

It is a further object of the present invention to provide a circuit and a power-supply control method in which the circuit may be disposed in close proximity to a load requiring a minimum space.

According to a first aspect of the present invention, there is provided a circuit disposed in close proximity to a load, wherein the load is a CPU controlled between sleep (idle) and operating states by the value of a stop-clock signal input thereto. The circuit comprises a transistor connected to a DC power supply in parallel with power-supply terminals of the load, and a control circuit controlling a current, which flows into the transistor, in dependence upon a change in working current of the load, thereby inhibiting a fluctuation in voltage across the power-supply terminals of the load.

According to second aspect, a fluctuation-inhibiting circuit comprises: a CPU controlled between a sleep state and an operating state by a value of a stop-clock signal applied thereto, the CPU having power-supply terminals; a current control element inserted in parallel with the CPU across the power-supply terminals thereof; and control means for varying a current, which flows into the current control element, in dependence upon a change in power-supply current of the CPU caused by a change in the stop-clock signal, thereby inhibiting a fluctuation in voltage across the power-supply terminals of the CPU.

According to a third aspect, a fluctuation-inhibiting circuit comprises: a CPU controlled between a sleep state and an operating state by a value of a stop-clock signal applied thereto, the CPU having power-supply terminals;

a transistor inserted in parallel with the CPU across the power-supply terminals thereof; and control means for supplying the transistor with a bias voltage, comparing a predetermined voltage and a voltage proportional to a current which flows into the transistor and performing feedback control in such a manner that the current which flows into the transistor is rendered proportional to the reference voltage.

According to a fourth aspect, a fluctuation-inhibiting circuit comprises: a CPU controlled between a sleep state and an operating state by the value of a stop-clock signal applied thereto from a stop-clock terminal, the CPU having a control terminal and power-supply terminals; a transistor inserted in parallel with the CPU across the power-supply terminals thereof; an operational amplifier having an output terminal connected to the control terminal of the transistor and having, as differential inputs, a reference voltage and a voltage proportional to a current which flows into the transistor, the operational amplifier performing feedback control in such a manner that the current which flows into the transistor is rendered proportional to the reference voltage; and first and second switches serially inserted across the power-supply terminals and each having a control terminal connected to a current-value control terminal for being turned on and off by a value of a signal input to the current-value control terminal, wherein when one of the switches is turned on, the other is turned off;

wherein a node at which the first and second switches are connected together is connected to a reference-voltage circuit via a time-constant circuit;

a node at which an output terminal of the time-constant circuit and an output terminal of the reference-voltage circuit are connected together is connected to a reference-potential input terminal of the operational amplifier; and when the first switch turns on, an output voltage from the reference-voltage terminal is applied to the operational amplifier as the reference voltage, and when the second switch turns on, ground potential is applied to the operational amplifier as the reference voltage.

Here, the time-constant circuit may have its time constant varied by a value of a time-constant control signal input thereto from a time-constant control terminal.

The value of the signal input to the current-value control terminal may be set to turn on the first switch and turn off the second switch before the CPU changes from the sleep state to the operating state, whereby a voltage at a reference-voltage input terminal of the operational amplifier is caused to rise via the time-constant circuit so that the current which flows into the transistor rises comparatively slowly as the voltage rises, and wherein after the current which flows into the transistor attains a predetermined value, the time-constant control signal input to the time-constant control terminal is changed over to thereby diminish the time constant of the time-constant circuit, under which conditions the current-value control signal is changed over in sync with a stop-clock signal that places the CPU in the operating state, thereby turning off the first switch and turning on the second switch, whereby the current which flows into the transistor is decreased as the current through the CPU increases.

Further, the control may be performed in such a manner that when the CPU is placed in the sleep state, the current-value control signal is changed over in sync with a stop-clock signal that places the CPU in the sleep state, thereby turning on the first switch so that the current which flows into the transistor increases with a decrease in current through the CPU, after which the time-constant control signal is changed over to restore the original time constant, this being followed by changing over the current-value control signal to thereby turn on the second switch so that a voltage at a reference-voltage input terminal of the operational amplifier returns to ground potential comparatively slowly, whereby the current which flows into the transistor is decreased.

According to a fifth aspect, there is provided a circuit for inhibiting fluctuation of a power-supply voltage disposed in close proximity to a load, wherein the load is a CPU controlled between sleep and operating states by a stop-clock signal input thereto, the circuit comprising: a transistor having a collector and an emitter connected between DC power-supply terminals of the load such that the transistor is connected in parallel with the load; and a control circuit controlling current across the collector and emitter of the transistor in dependence upon a change in working current of the load, thereby inhibiting a fluctuation in voltage across the power-supply terminals of the load.

According to a sixth aspect, a fluctuation-inhibiting circuit is disposed in close proximity to a load, wherein the load is a CPU control led between sleep and operating states by a stop-clock signal input thereto, the circuit comprising: a transistor having a collector and an emitter connected between DC power-supply terminals of the load such that the transistor is connected in parallel with the load; and a control circuit controlling, by an externally applied control signal, current across the collector and emitter of the transistor in sync with a change in working current of the load, thereby inhibiting a fluctuation in voltage across the power-supply terminals of the load.

According to a seventh aspect, the fluctuation-inhibiting circuit is disposed in close proximity to a load, the circuit comprising: a transistor having a collector and an emitter connected between DC power-supply terminals of the load such that the transistor is connected in parallel with the load; and a control circuit for controlling current across the collector and emitter of the transistor in such a manner that the sum of the working current of the load and the current across the collector and emitter of the transistor is rendered constant, thereby inhibiting a fluctuation in voltage across the power-supply terminals of the load.

In the present invention, the transistor may comprise a MOSFET. In this case the collector and emitter of the transistor constitute a drain and source, respectively, of the MOSFET, whereas the base a gate thereof.

According to an eighth aspect, there is provided a circuit or inhibiting fluctuation of a power-supply voltage, the circuit comprises the following elements:

a transistor inserted in parallel with a power-supply terminals of a load driven by a DC power supply and controlled between a sleep state and an operating state by a stop-clock signal;

an operational amplifier having an output terminal connected to the control terminal of the transistor and having, as differential inputs, a reference voltage and a voltage proportional to a current which flows into the transistor, the operational amplifier performing feedback control in such a manner that a current which flows into the transistor is rendered proportional to the reference voltage; and first and second switches serially inserted across the power-supply terminals and each having a control terminal connected to a current-value control terminal for being turned on and off by the value of a signal input to a current-value control terminal, wherein when one of the switches is turned on, the other is turned off;

wherein a node at which the first and second switches are connected together is connected to a reference-voltage circuit via a time-constant circuit;

a potential at a node at which an output terminal of the time-constant circuit and an output terminal of the reference-voltage circuit are connected together is connected to a reference-potential input terminal of the operational amplifier; and when the first switch turns on, an output voltage from the reference-voltage terminal is applied to the operational amplifier as the reference voltage, and when the second switch turns on, ground potential is applied to the operational amplifier as the reference voltage.

Here, the time-constant circuit has its time constant varied by a value of a time-constant control signal input thereto from a time-constant control terminal.

The value of the signal input to the current-value control terminal is set to turn on the first switch and turn off the second switch before the load changes from the sleep state to the operating state, whereby a voltage at a reference-voltage input terminal of the operational amplifier is caused to rise via the time-constant circuit so that the current which flows into the transistor rises comparatively slowly as the voltage rises, and wherein after the current which flows into the transistor attains a predetermined value, the time-constant control signal input to the time-constant control terminal is changed over to thereby diminish the time constant of the time-constant circuit, under which conditions the current-value control signal is changed over in sync with a stop control signal that places the load in the operating state, thereby turning off the first switch and turning on the second switch, whereby the current which flows into the transistor is decreased as the current through the load increases.

The control is performed in such a manner that when the load is placed in the sleep state, the current-value control signal is changed over in sync with a stop control signal that places the load in the sleep state, thereby turning on the first switch so that the current which flows into the transistor increases with a decrease in current through the load, after which the time-constant control signal is changed over to restore the original time constant, this being followed by changing over the current-value control signal to thereby turn on the second switch so that a voltage at a reference-voltage input terminal of the operational amplifier returns to ground potential comparatively slowly, whereby the current which flows into the transistor is decreased.

According to a ninth aspect, there is provided a method of controlling a power-supply voltage control circuit, the control circuit comprises:

(a1) a CPU control led between a sleep state and an operating state by the value of a stop-clock signal applied thereto, the CPU having power-supply terminals;

(a2) a transistor inserted in parallel with the CPU across the power-supply terminals thereof; and (a3) an operational amplifier having an output terminal connected to the control terminal of the transistor and having, as inputs, a reference voltage and a voltage proportional to a current which flows into the transistor, the operational amplifier performing feedback control in such a manner that the current which flows into the transistor is rendered proportional to the reference voltage; and (a4) first and second switches serially inserted across the power-supply terminals and each having a control terminal connected to a current-value control terminal for being turned on and off by the value of a signal input to the current-value control terminal, wherein when one of the switches is turned on, the other is turned off;

(b) wherein a node at which the first and second switches are connected together is connected to a diode which supplies a reference voltage via a time-constant circuit;

(c) a potential at a node at which an output terminal of the time-constant circuit and the diode are connected together is supplied as a reference potential to a non-inverting input terminal of the operational amplifier;

(d) terminal voltage of the diode is supplied as the reference voltage to the operational amplifier when the first switch is turned on and ground potential is supplied as the reference voltage to the operational amplifier when the second switch is turned on; and (e) the time-constant circuit has its time constant varied by a time-constant control signal input thereto from a time-constant control terminal;

(f) the method further comprising the steps of:

(f1) setting a value at the current-value control terminal so as to turn on the first switch and turn off the second switch before the CPU changes from the sleep state to the operating state, whereby a voltage at a reference-voltage input terminal of the operational amplifier is caused to rise via the time-constant circuit so that the current which flows into the transistor rises comparatively slowly as the voltage rises;

(f2) changing over the time-constant control signal input to the time-constant control terminal to diminish the time constant of the time-constant circuit after the current which flows into the transistor attains a predetermined value; and (f3) under these conditions, changing over the current-value control signal in sync with a stop-clock signal that places the CPU in the operating state, thereby turning off the first switch and turning on the second switch, whereby the current which flows into the transistor is decreased as the current through the CPU increases.

The method according further comprises:

(g) changing over the current-value control signal, in sync with a stop-clock signal that places the CPU in the sleep state, so as to turn on the first switch and turn off the second switch when the CPU is placed in the sleep state, whereby the current which flows into the transistor increases with a decrease in current through the CPU;

(h) subsequently changing over the time-constant control signal to restore the original time constant; and (i) subsequently changing over the current-value control signal so as to turn on the second switch so that a voltage at a reference-voltage input terminal of the operational amplifier returns to ground potential comparatively slowly, whereby the current which flows into the transistor is decreased.

PREFERRED EMBODIMENTS OF THE INVENTION

In terms of the principle and operation of the present invention, the current which flows into the transistor parallel-connected across the power-supply terminals of the load is reduced in conformity with an increase in the working current of the load when the working current increases. Conversely, when the load current decreases, the current which flows into the transistor is increased accordingly.

As a result of this operation, the change in current as seen from the DC power is mitigated, thereby inhibiting a fluctuation in the voltage across the power-supply terminals of the load.

The results of a circuit simulation performed in order to verify the principle of the present invention will now be described.

FIG. 5 is an equivalent circuit of a circuit according to an embodiment of the present invention. This diagram shows the construction of the circuit used in the circuit simulation. Specifically, the circuit includes a load 3 to which power from a DC power supply 1 is supplied by a power line 2 via a line impedance 4 comprising an inductor. The load 3 is represented by a model in the form of a current source the current of which fluctuates. The simulation assumes that current increases from 1 A to 3A. A power-supply fluctuation inhibiting circuit 5, which is a circuit in accordance with the present invention, is connected in parallel with the load 3 and is represented by a model in the form of a current source which fluctuates in conformity with the current through the load 3.

The terminal voltage of the load 3 when the power-supply fluctuation inhibiting circuit 5 of the present invention is included was compared with that in the absence of the circuit 5, the latter case being a comparative example. FIG. 6 illustrates the results of the simulation in the case of the comparative example, i.e., in the absence of the power-supply fluctuation inhibiting circuit 5. Load current is indicated in FIG. 6(a) and the waveform of the load terminal voltage is shown in FIG. 6(b). As a result of the line impedance 4, the terminal voltage of the load 3 decreases by 0.04 V when the current through the load 3 increases, and increases by 0.04 V when the current through the load 3 decreases, as illustrated in FIG. 6. Thus, the terminal voltage of the load 3 fluctuates by a total of 0.08 V.

FIG. 7 illustrates the results of the simulation in the case where the power-supply fluctuation inhibiting circuit 5 of this invention is provided. Load current is indicated at (a) of FIG. 7 and the waveform of the load terminal voltage is shown at (b) of FIG. 7. The current that flows into the power-supply fluctuation inhibiting circuit 5 of the invention starts increasing before the current through load 3 does and then decreases with the increase in the load current. Further, the current that flows into the power-supply fluctuation inhibiting circuit 5 of the invention increases with a decrease in the current through the load 3 and then decreases. As a result of this operation, the fluctuation in the terminal voltage of the load 3 is held to 0.008 V.

By thus providing, in close proximity to the load 3, the power-supply fluctuation inhibiting circuit 5 for passing a current in conformity with an increase or decrease in the load current so as to cancel (offset or counteract) this change in current, it is possible to inhibit a fluctuation in the terminal voltage of the load 3. Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

A preferred mode for practicing the present invention will be described with reference to FIG. 1.

Figure 1:
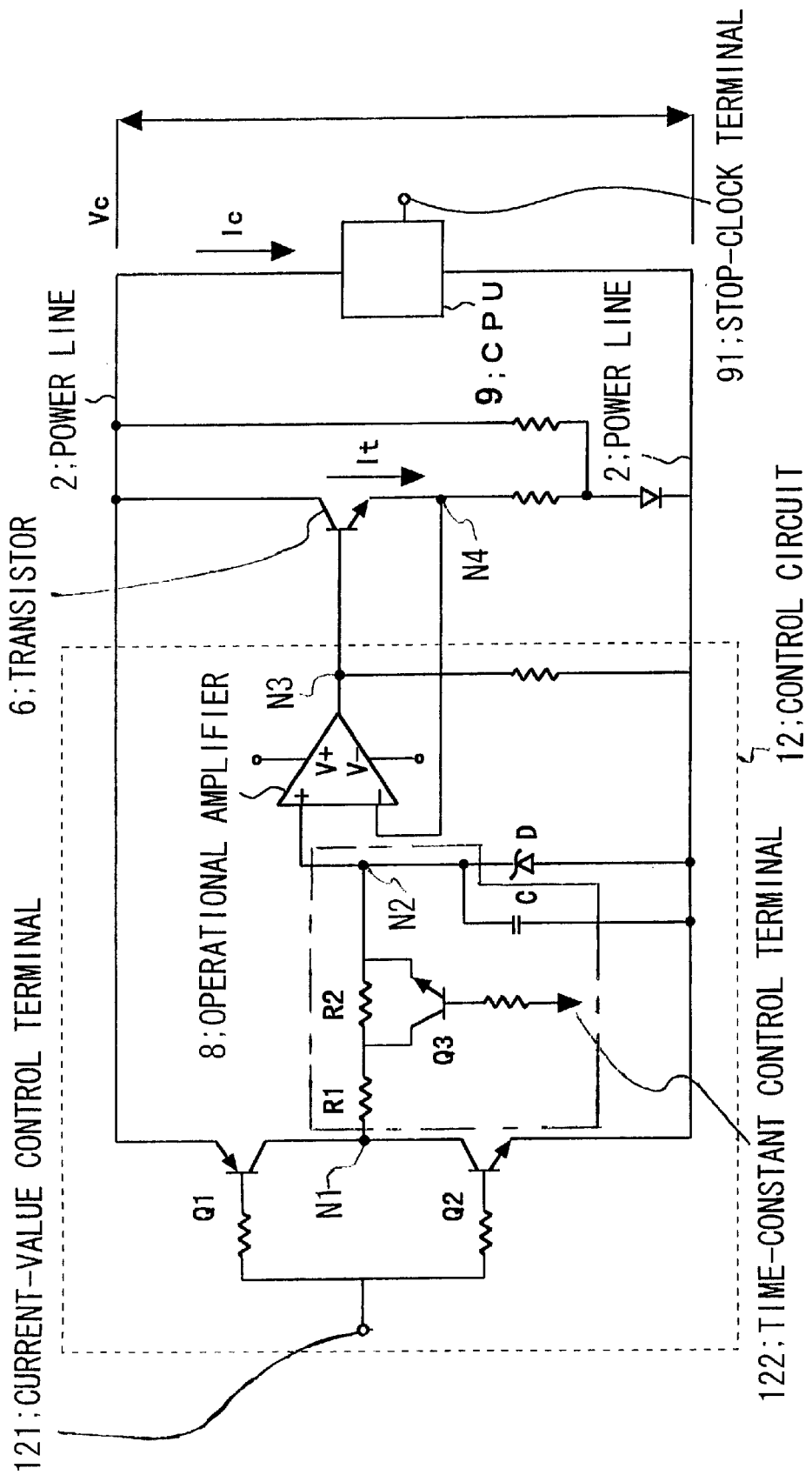
FIG. 1 is a circuit diagram showing the structure of a circuit according to a first embodiment of the present invention.

As shown in FIG. 1, a CPU 9 is driven by a DC power supply and is controlled between sleep and operating states by the value of a stop-clock signal applied thereto from a stop-clock terminal 91. The circuit includes a transistor 6 connected to the DC power supply and inserted in parallel with the power-supply terminals of the CPU 9; an operational amplifier 8 having its output terminal N3 connected to a control terminal of the transistor 6 and having a reference voltage and a voltage (the emitter voltage, at node N4, of the transistor 6), which is proportional to a current It that flows through the transistor 6, applied to its non-inverting input terminal (+) and inverting input terminal (−), respectively, for exercising feedback control in such a manner that current It that flows through the transistor 6 is rendered proportional to the reference voltage; and first and second switches (transistors) Q1, Q2 inserted serially between the power-supply terminals (lines) and having their control terminals connected to a current-value control terminal 121 for being turned on and off depending upon the value of a current-value control signal, which is applied to the current-value control terminal 12, in such a manner that when one of these switches is turned on, the other is turned off. A node N1 at which the first switch Q1 and second switch Q2 are connected is connected to the cathode terminal of a diode D which supplies the reference voltage via a time-constant circuit (composed of resistors R1 and R2, or solely resistor R1, and a capacitor C). The potential at the node N2 of the output terminal of this time-constant circuit and diode D is applied as a reference potential to the non-inverting input terminal (+) of the operational amplifier 8. When the first switch Q1 is on, the terminal voltage of the diode D is applied to the operational amplifier 8 as the reference voltage. When the second switch Q2 is on, 0 V, which is the low power-supply potential, is applied to the operational amplifier 8 as the reference voltage.

In this preferred mode for practicing the present invention, the value at the current-value control terminal 121 is changed over before the CPU 9 changes from the sleep state to the operating state, thereby turning on the first switch Q1. As a consequence, the voltage on the reference-voltage input side of the operational amplifier 8 rises via the time-constant circuit and the current that flows into the transistor 6 increases comparatively slowly. After the current flowing into the transistor 6 attains a predetermined value, a time-constant control signal input to a time-constant control terminal 122 is changed over, thereby reducing the time constant of the time-constant circuit. Under these conditions, the current-value control signal at terminal 122 is changed over in sync with the stop-clock signal, which places the CPU 9 in the operating state, thereby turning off the first switch Q1 and turning on the second switch Q2 so that the current which flows through the transistor 6 is reduced with an increase in the operating current of the CPU 9.

When the CPU 9 is placed in the sleep state from the operating state, on the other hand, the current-value control signal at terminal 121 is changed over in sync with the stop-clock signal, which places the CPU 9 in the sleep state, so as to turn on the first switch Q1. As a result, the current which flows into the transistor 6 increases, after which the time-constant control signal is changed over to restore the previous time constant. The control signal at the current-value control terminal is then changed over so as to turn on the second switch Q2 so that the voltage on the reference-voltage side of the operational amplifier slowly returns to 0 V, and the current which flows into the transistor 6 gradually decreases.

Preferred embodiments of the present invention will now be described in greater detail with reference to the drawings.

FIG. 1 is a diagram showing the circuit arrangement of a first embodiment of the present invention. Here the present invention is applied to the stop clock of a CPU.

As shown in FIG. 1, the CPU 9 and transistor 6 are parallel-connected to the power lines 2. The current It which flows across the collector and emitter of the transistor 6 is controlled in conformity with the working current Ic of the CPU 9 to thereby inhibit a change in terminal voltage Vc of the CPU 9.

The control of current It through the transistor 6 is carried out by a control circuit 12.

The base of the transistor 6 is connected to the output terminal of the operational amplifier 8, which compares the reference voltage and the voltage proportional to the current It input to the non-inverting and inverting input terminals, respectively, thereby making the current It proportional to the reference voltage.

Control of the reference voltage is performed by inputting control signals from the system side to the current-value control terminal 121 and time-constant control terminal 122. Either transistor (first switch) Q1 or transistor (second switch) Q2 is turned on by the signal input to the current-value control terminal 121. When the transistor Q1 is turned on, the voltage produced at the diode D becomes the reference voltage. When the transistor Q2 is turned on, the reference voltage becomes 0 V. As a result, the current It which flows into the transistor 6 becomes either a certain fixed value or 0 (zero) A.

Furthermore, the charge/discharge time constant of the capacitor C connected in parallel with the diode D is changed by the input signal at the time-constant control terminal 122, thereby controlling the speed at which the current It that flows into the transistor 6 changes.

Figure 2:
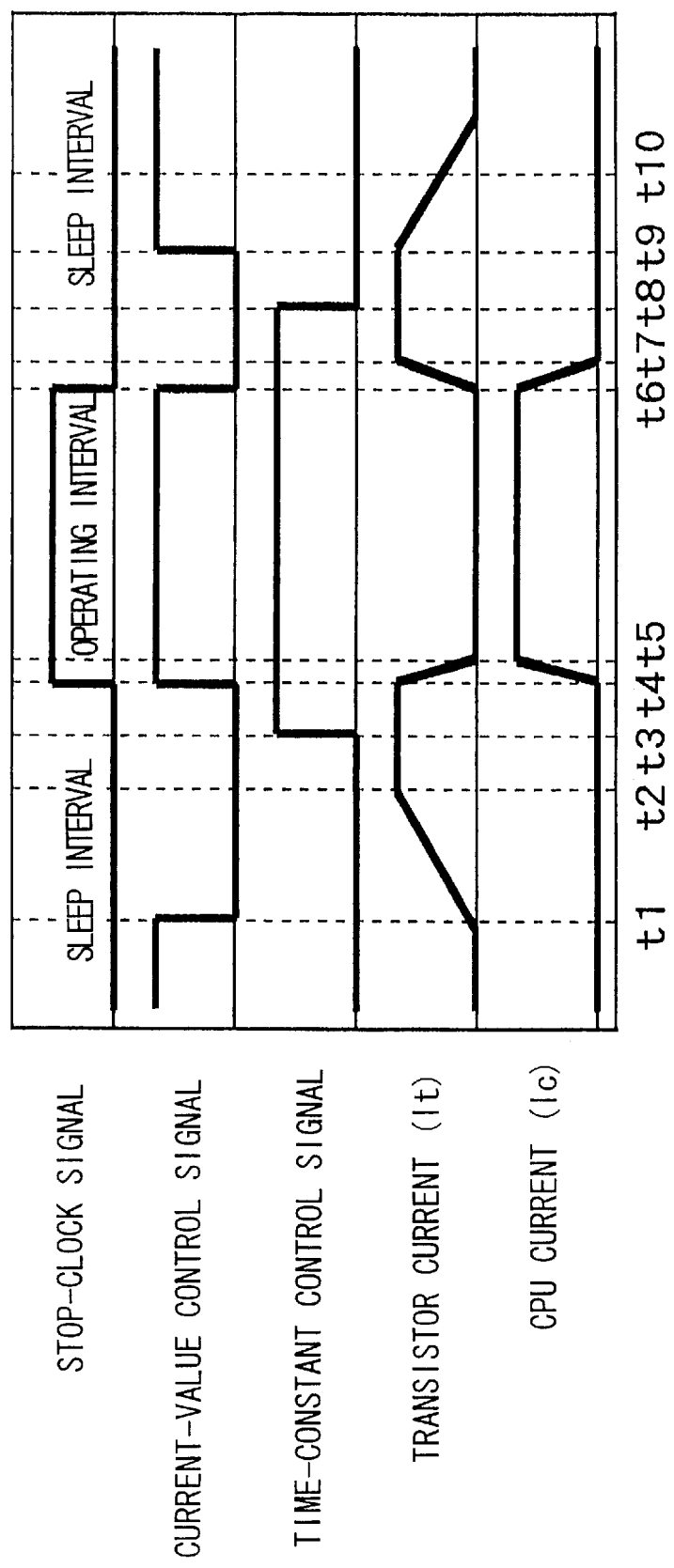
FIG. 2 is a timing chart useful in describing the operation of the first embodiment.

In terms of the operation of this embodiment, FIG. 2 illustrates a timing chart useful in describing this operation. FIG. 2 shows transition with time of the signal waveforms of the stop-clock signal, current-value control signal, time-constant control signal, current It of the transistor 6 and CPU current Ic. The signals are shown when a transition is made from the sleep state to the operating state and then from the operating state back to the sleep state.

First, before the CPU 9 undergoes a transition from the sleep state to the operating state, the control signal at the current-value control terminal 121 is changed from the high level to the low level at time t1. As a result, transistor Q1 turns on, a charging current flows into the capacitor C via the resistors R1 and R2, the voltage on the reference-voltage side (the side of the non-inverting input terminal) of the operational amplifier 8 rises and this is accompanied by an increase in the current It of transistor 6. At this time the transistor current It increases comparatively slowly owing to the time constant based on the resistors R1, R2 and capacitor C, as a result of which there is little fluctuation in the terminal voltage Vc of the CPU (time t2).

After the current It of transistor 6 attains a predetermined value, the time-constant control signal input to the time-constant control terminal 122 is raised from the low to the high level at step t3. As a result, a transistor Q3 having the resistor R2 connected between its collector and emitter is turned on so that the resistor R2 is bypassed. The time constant of the circuit, therefore, now is formed by the resistor R1 and capacitor C and, hence, the value of the time constant is diminished.

If, under these conditions, a signal is applied that sends the current-value control signal at terminal 121 to the high level in sync with the stop-clock signal, which places the CPU 9 in the operating state, then the current It that flows into the transistor 6 decreases with an increase in the current Ic of CPU 9. As a result of this operation, fluctuation of the terminal voltage Vc of the CPU 9 is suppressed (times t4 to t5).

When the CPU 9 is placed in the sleep state, a signal that sends the current-value control signal to the low level is input in sync with the stop-clock signal that places the CPU 9 in the sleep state. The current It which flows into the transistor 6 increases with a decrease in the current Ic of CPU 9. Fluctuation of Vc is inhibited as a result of this operation (times t6 to t7).

The time-constant control signal is thenceforth switched from the high to the low level to restore the time constant formed by the resistors R1, R2 and capacitor C (time t8), and the current-value control signal at current-value control terminal 121 is placed at the high level (time t9).

In response, the transistor Q2 turns on, the discharge current of capacitor C flows through the resistors R1 and R2, and the voltage on the reference-voltage side (the side of the non-inverting input terminal +) of the operational amplifier 8 slowly returns to zero. This is accompanied by a slow decrease in the current It which flows into the transistor 6 (time t10).

Figure 3:
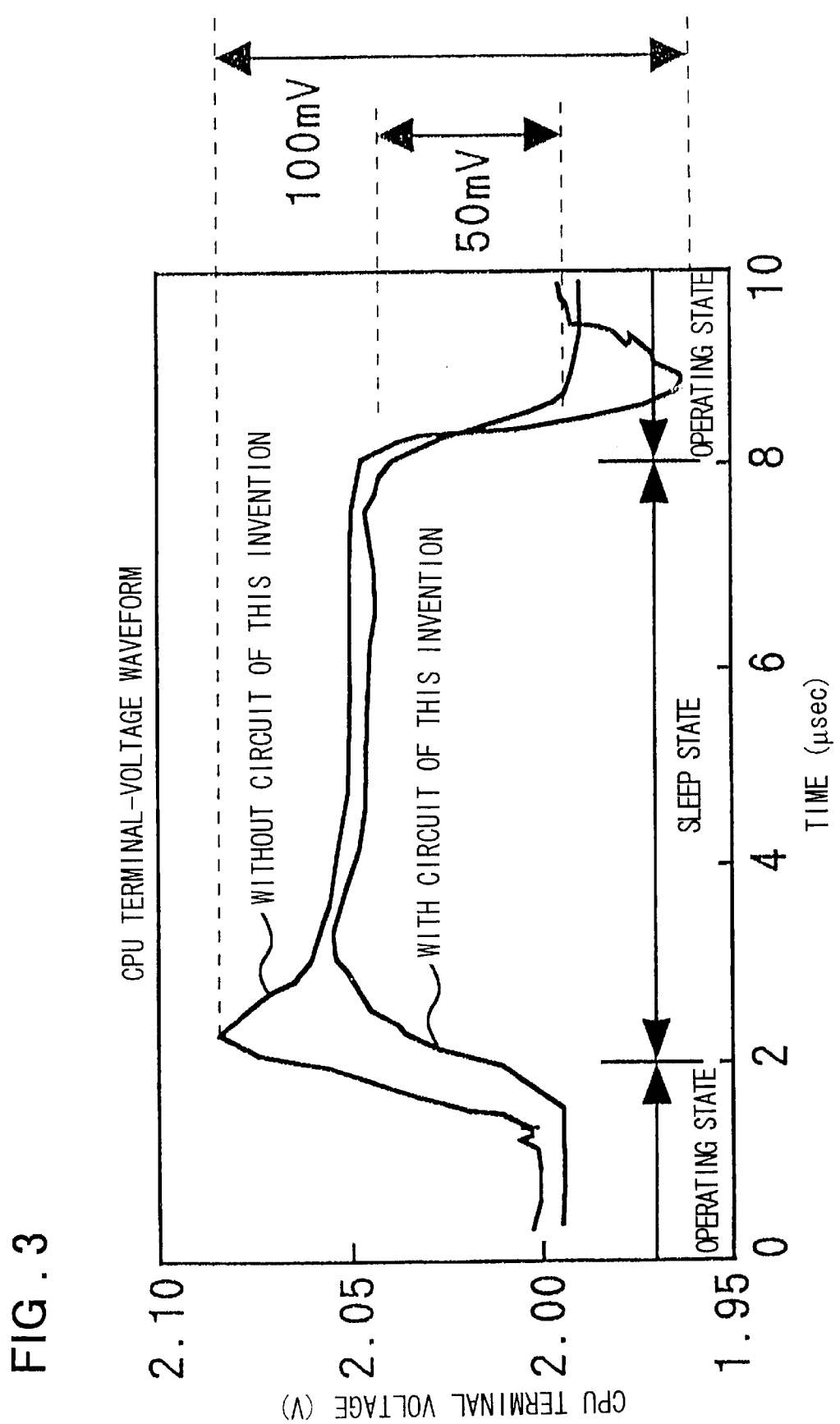
FIG. 3 is a waveform diagram illustrating the waveform of CPU terminal voltage according to the first embodiment and the waveform of CPU terminal voltage in a case, which is a comparative example, where the circuit of the first embodiment is not provided.

FIG. 3 is a diagram showing results of measurement obtained by subjecting the CPU to the stop-clock operation and measuring the CPU terminal voltage when the circuit of this embodiment of the present invention is and is not provided.

It will be understood from FIG. 3 that whereas a voltage change of about 100 mV occurs in a case where the circuit of this embodiment is not employed, overshoot and undershoot at the time of the change in state is improved (suppressed), and the change in voltage is limited to about 50 mV in a case where the circuit of this embodiment is employed. The effectiveness of suppressing the fluctuation in the terminal voltage of the CPU was thus confirmed.

A second embodiment of the present invention will now be described.

Figure 4:
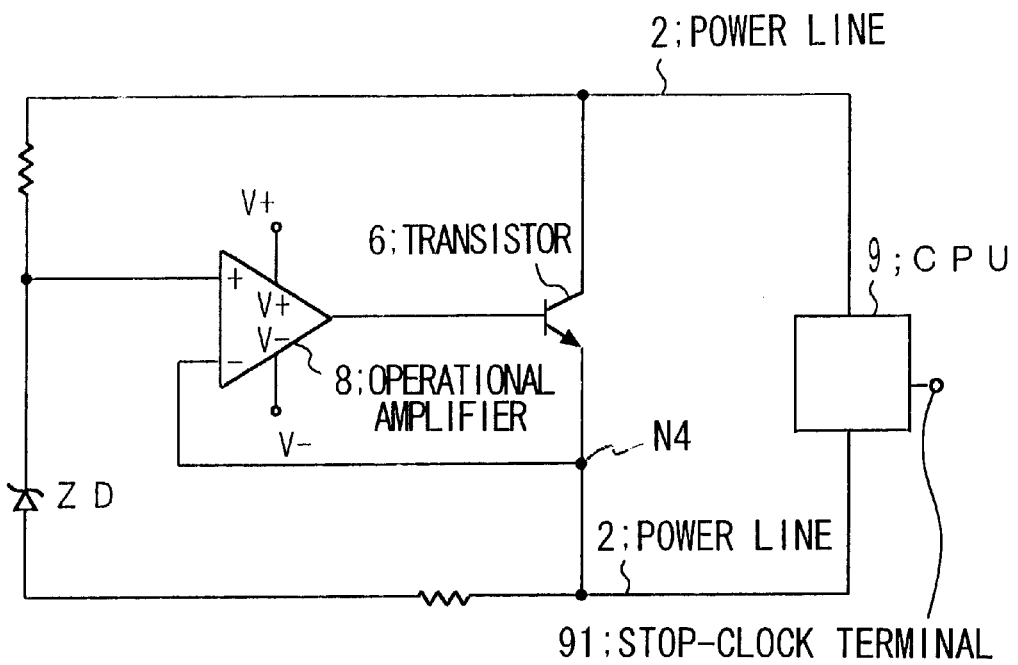
FIG. 4 is a circuit diagram showing the structure of a circuit according to a second embodiment of the present invention.
Figure 5:
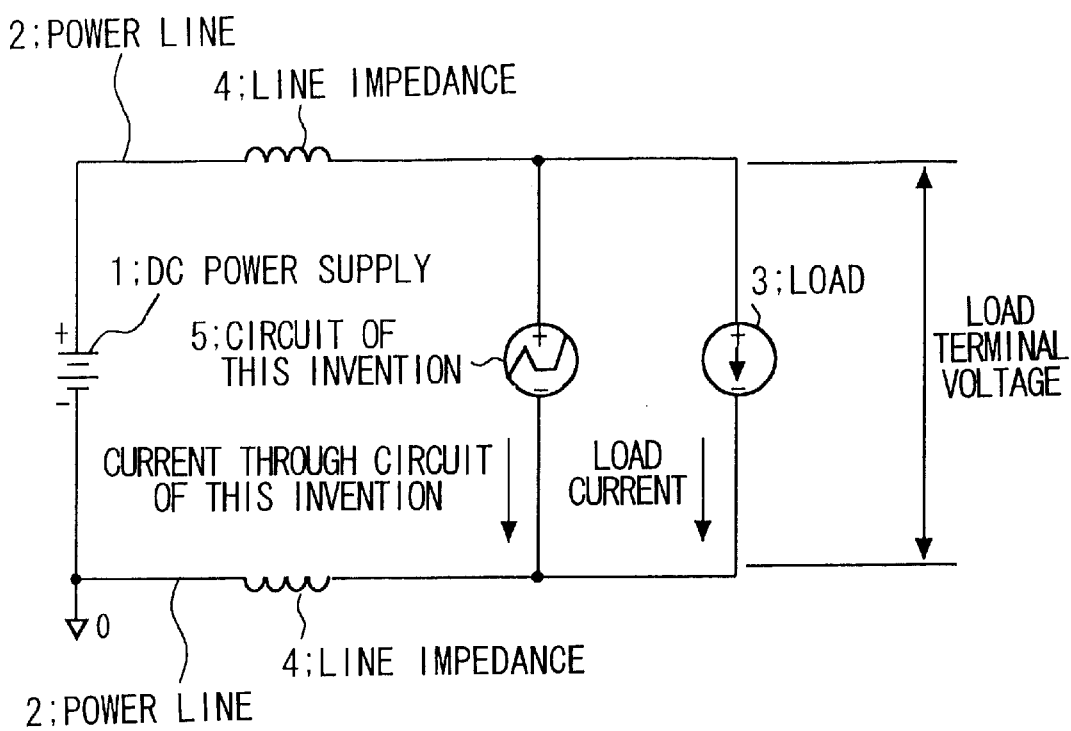
FIG. 5 is a diagram showing a circuit for a simulation useful in describing the operating principle of the present invention.
Figure 6A:
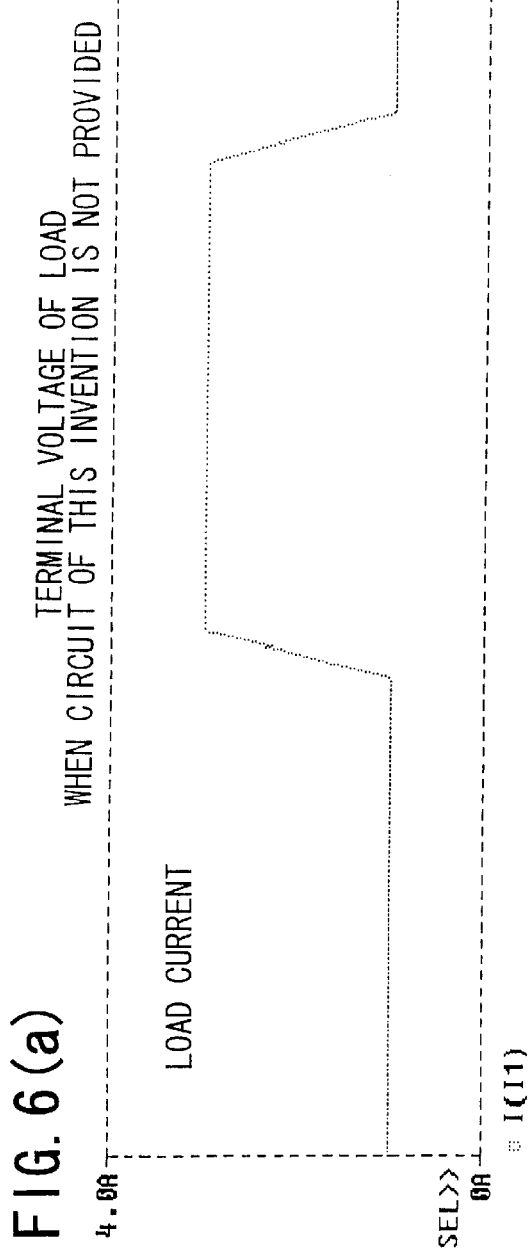
FIGS. 6(a) and 6(b) are diagrams showing the results of the simulation in the absence of the circuit according to the present invention.
Figure 6B:
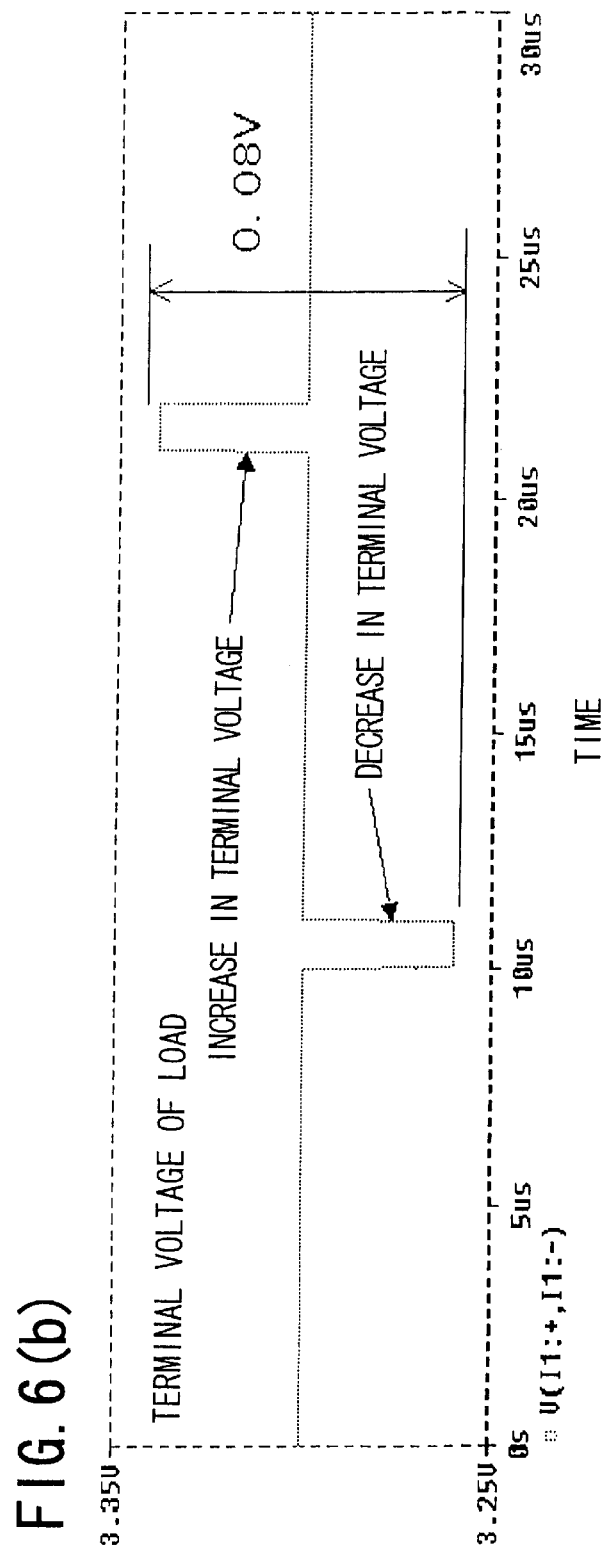
Figure 7:
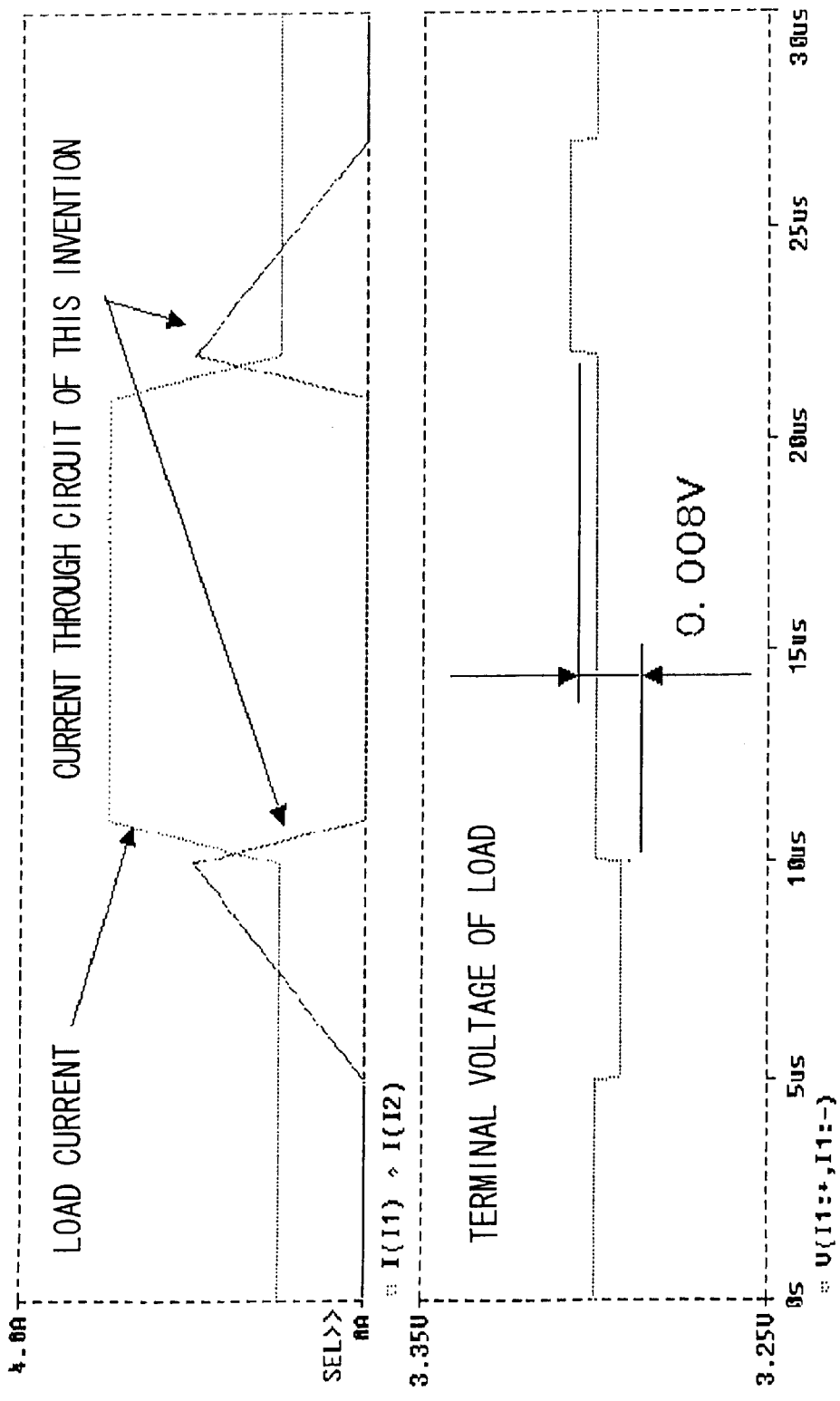
FIG. 7 is a diagram showing the results of the simulation in a case where the circuit according to the present invention is provided.
Figure 8:
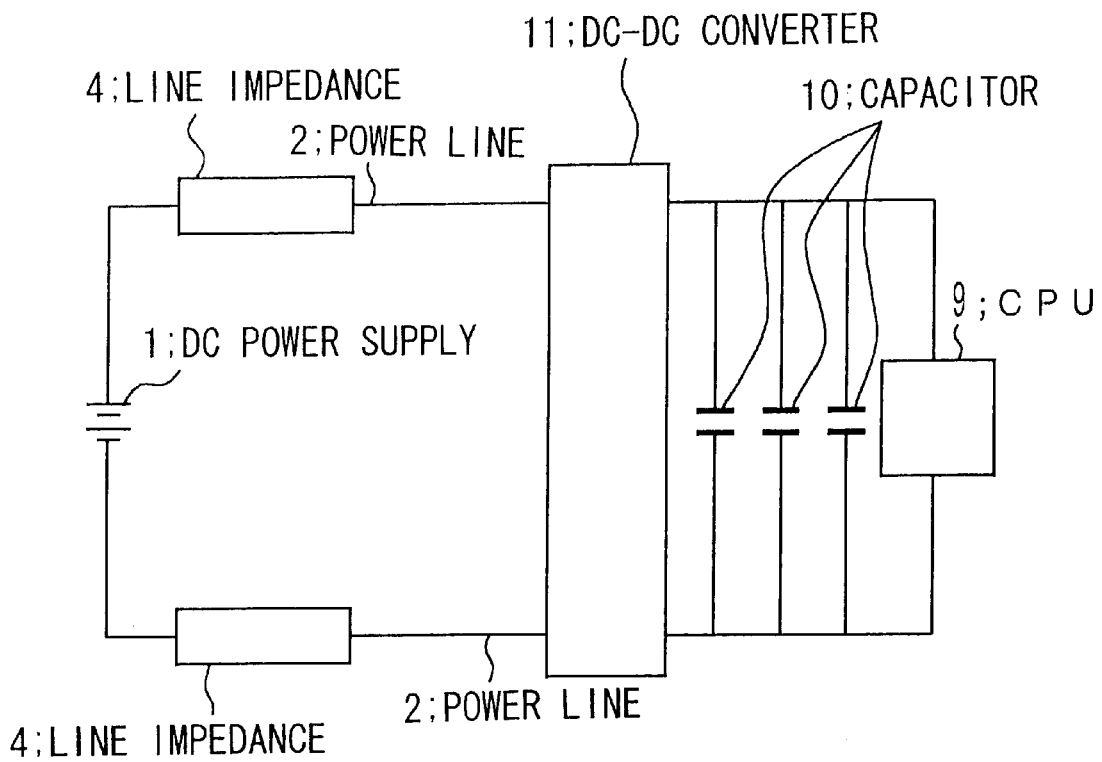
FIG. 8 is a diagram showing the structure of a power-supply control circuit used in equipment such as a personal computer in accordance with the prior art.

FIG. 4 is a diagram showing the circuit arrangement of a second embodiment of the present invention. Here also the present invention is applied to the stop clock of a CPU. According to the second embodiment, the sum of the working current of the CPU 9 and the current through the transistor 6 is sensed and the value of the current through transistor 6 is control led so as to render the sum constant at all times. More specifically, the collector and emitter of transistor 6 are connected across the power lines 2 of the CPU 9, the emitter potential, at node N4, of transistor 6 is input to the inverting input terminal of the operational amplifier 8 (which constitutes a voltage follower) and the terminal voltage of a Zener diode ZD is input to the non-inverting input terminal of the operational amplifier 8.

In order to completely suppress a fluctuation in voltage according to the second embodiment, it is necessary to exercise control in such a manner that the current which flows into the transistor 6 becomes 0 A at a maximum working current of the CPU 9, whereas when the working current of the CPU 9 is 0 A, the current which flows into the transistor 6 takes on a current value the same as that of the maximum working current of the CPU 9. As a consequence, current having a value the same as that of the maximum working current of CPU 9 continues to flow from the supply side of the power supply at all times. This means that if the sleep state of the CPU is prolonged, there will be a tendency for too much power to be consumed. The structure of the control circuit, however, is greatly simplified and a control signal from the system side is unnecessary. Accordingly, the second embodiment of the present invention can be applied to cases where sleep intervals of the CPU are short or to integrated circuits having short intervals during which other working currents are small.

Thus, the gist of the present invention resides in controlling transistor current so as to cancel out changes in load current. Other methods of achieving this include exercising control upon sensing a change in load current or upon sensing the terminal voltage of the load.

Further, an arrangement may be adopted in which the bipolar transistors used in the foregoing embodiments are replaced by monopolar, e.g., MOSFETs, in which the collector and emitter of the bipolar transistor should be replaced by drain and source, and base by gate.

The circuits of these embodiments can be constructed as integrated circuits. In a case where the present invention is integrated by incorporating it as part of the power supply of an existing integrated circuit, an externally provided decoupling capacitor required in the prior art can be eliminated and capacitance can be reduced. This makes it possible to construct devices of smaller size.

Thus, in accordance with the present invention, as described above, fluctuation in the power-supply terminal voltage of a load caused by a change in the working current of the load can be suppressed. Specifically, the current of a circuit connected in parallel with the load is decreased or increased in dependence upon an increase or decrease in the working current of the load, thereby inhibiting a fluctuation in the power-supply terminal voltage of the load.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A circuit for inhibiting fluctuation of a power-supply voltage, comprising:
    a CPU controlled between a sleep state and an operating state by a value of a stop-clock signal applied thereto, the CPU having power-supply terminals;
    a transistor inserted in parallel with said CPU across the power-supply terminals thereof; and
    a control circuit supplying said transistor with a bias voltage, comparing a predetermined voltage and a voltage proportional to a current which flows into said transistor and performing feedback control in such a manner that the current which flows into said transistor is rendered proportional to the reference voltage.

2. The circuit according claim 1, wherein said transistor comprises a MOSFET.

3. A circuit for inhibiting fluctuation of a power-supply voltage, comprising:
    a CPU controlled between a sleep state and an operating state by the value of a stop-clock signal applied thereto from a stop-clock terminal, the CPU having a control terminal and power-supply terminals;
    a transistor inserted in parallel with said CPU across the power-supply terminals thereof;
    an operational amplifier having an output terminal connected to the control terminal of said transistor and having, as differential inputs, a reference voltage and a voltage proportional to a current which flows into said transistor, said operational amplifier performing feedback control in such a manner that the current which flows into said transistor is rendered proportional to the reference voltage; and
    first and second switches serially inserted across the power-supply terminals and each having a control terminal connected to a current-value control terminal for being turned on and off by a value of a signal input to the current-value control terminal, wherein when one of said switches is turned on, the other is turned off;
    wherein a node at which said first and second switches are connected together is connected to a reference-voltage circuit via a time-constant circuit;
    a node at which an output terminal of said time-constant circuit and an output terminal of said reference-voltage circuit are connected together is connected to a reference-potential input terminal of said operational amplifier; and
    when said first switch turns on, an output voltage from said reference-voltage terminal is applied to said operational amplifier as the reference voltage, and when said second switch turns on, ground potential is applied to said operational amplifier as the reference voltage.

4. The circuit according to claim 3, wherein said time-constant circuit has its time constant varied by a value of a time-constant control signal input thereto from a time-constant control terminal.

5. The circuit according to claim 4, wherein the value of the signal input to the current-value control terminal is set to turn on said first switch and turn off said second switch before said CPU changes from the sleep state to the operating state, whereby a voltage at a reference-voltage input terminal of said operational amplifier is caused to rise via said time-constant circuit so that the current which flows into said transistor rises comparatively slowly as said voltage rises, and
    wherein after the current which flows into said transistor attains a predetermined value, the time-constant control signal input to the time-constant control terminal is changed over to thereby diminish the time constant of said time-constant circuit, under which conditions the current-value control signal is changed over in sync with a stop-clock signal that places said CPU in the operating state, thereby turning off said first switch and turning on said second switch, whereby the current which flows into said transistor is decreased as the current through said CPU increases.

6. The circuit according to claim 4, wherein control is performed in such a manner that when said CPU is placed in the sleep state, the current-value control signal is changed over in sync with a stop-clock signal that places said CPU in the sleep state, thereby turning on said first switch so that the current which flows into said transistor increases with a decrease in current through said CPU, after which the time-constant control signal is changed over to restore the original time constant, this being followed by changing over the current-value control signal to thereby turn on said second switch so that a voltage at a reference-voltage input terminal of said operational amplifier returns to ground potential comparatively slowly, whereby the current which flows into said transistor is decreased.

7. A circuit for inhibiting fluctuation of a power-supply voltage disposed in close proximity to a load, wherein said load is a CPU controlled between sleep and operating states by a stop-clock signal input thereto, said circuit comprising:
   a transistor having a collector and an emitter connected between DC power-supply terminals of the load such that said transistor is connected in parallel with said load; and
   a control circuit controlling current across the collector and emitter of said transistor in dependence upon a change in working current of said load, thereby inhibiting a fluctuation in voltage across the power-supply terminals of the load.

8. The circuit according claim 7, wherein said transistor comprises a MOSFET and the collector and emitter of said transistor constitute a drain and source, respectively, of said MOSFET.

9. A circuit for inhibiting fluctuation of a power-supply voltage disposed in close proximity to a load, wherein said load is a CPU control led between sleep and operating states by a stop-clock signal input thereto, said circuit comprising:
   a transistor having a collector and an emitter connected between DC power-supply terminals of the load such that said transistor is connected in parallel with said load; and
   a control circuit controlling, by an externally applied control signal, current across the collector and emitter of said transistor in sync with a change in working current of said load, thereby inhibiting a fluctuation in voltage across the power-supply terminals of the load.

10. The circuit according claim 9, wherein said transistor comprises a MOSFET and the collector and emitter of said transistor constitute a drain and source, respectively, of said MOSFET.

11. A circuit for inhibiting fluctuation of a power-supply voltage disposed in close proximity to a load, wherein said load is a CPU controlled between sleep and operating states by a stop-clock signal input thereto, said circuit comprising:
   a transistor having a collector and an emitter connected between DC power-supply terminals of the load such that said transistor is connected in parallel with said load; and
   a control circuit for controlling current across the collector and emitter of said transistor in such a manner that the sum of the working current of said load and the current across the collector and emitter of said transistor is rendered constant, thereby inhibiting a fluctuation in voltage across the power-supply terminals of the load.

12. A circuit for inhibiting fluctuation of a power-supply voltage, comprising:
   a CPU controlled between a sleep state and an operating state by a value of a stop-clock signal applied thereto, the CPU having power-supply terminals;
   a current control element inserted in parallel with said CPU across the power-supply terminals thereof; and
   a control circuit varying a current, which flows into said current control element, in dependence upon a change in power-supply current of said CPU caused by a change in the stop-clock signal, thereby inhibiting a fluctuation in voltage across the power-supply terminals of said CPU.

13. A circuit for inhibiting fluctuation of a power-supply voltage, comprising:
   a transistor inserted in parallel with a power-supply terminals of a load driven by a DC power supply and controlled between a sleep state and an operating state by a stop-clock signal;
   an operational amplifier having an output terminal connected to the control terminal of said transistor and having, as differential inputs, a reference voltage and a voltage proportional to a current which flows into said transistor, said operational amplifier performing feedback control in such a manner that a current which flows into said transistor is rendered proportional to the reference voltage; and
   first and second switches serially inserted across the power-supply terminals and each having a control terminal connected to a current-value control terminal for being turned on and off by the value of a signal input to a current-value control terminal, wherein when one of said switches is turned on, the other is turned off;
   wherein a node at which said first and second switches are connected together is connected to a reference-voltage circuit via a time-constant circuit;
   a potential at a node at which an output terminal of said time-constant circuit and an output terminal of said reference-voltage circuit are connected together is connected to a reference-potential input terminal of said operational amplifier; and
   when said first switch turns on, an output voltage from said reference-voltage terminal is applied to said operational amplifier as the reference voltage, and when said second switch turns on, ground potential is applied to said operational amplifier as the reference voltage.

14. The circuit according to claim 13, wherein said time-constant circuit has its time constant varied by a value of a time-constant control signal input thereto from a time-constant control terminal.

15. The circuit according to claim 14, wherein the value of the signal input to the current-value control terminal is set to turn on said first switch and turn off said second switch before said load changes from the sleep state to the operating state, whereby a voltage at a reference-voltage input terminal of said operational amplifier is caused to rise via said time-constant circuit so that the current which flows into said transistor rises comparatively slowly as said voltage rises, and
   wherein after the current which flows into said transistor attains a predetermined value, the time-constant control signal input to the time-constant control terminal is changed over to thereby diminish the time constant of said time-constant circuit, under which conditions the current-value control signal is changed over in sync with a stop control signal that places said load in the operating state, thereby turning off said first switch and turning on said second switch, whereby the current which flows into said transistor is decreased as the current through said load increases.

16. The circuit according to claim 14, wherein control is performed in such a manner that when said load is placed in the sleep state, the current-value control signal is changed over in sync with a stop control signal that places said load in the sleep state, thereby turning on said first switch so that the current which flows into said transistor increases with a decrease in current through said load, after which the time-constant control signal is changed over to restore the original time constant, this being followed by changing over the current-value control signal to thereby turn on said second switch so that a voltage at a reference-voltage input terminal of said operational amplifier returns to ground potential comparatively slowly, whereby the current which flows into said transistor is decreased.

17. A method of controlling a power-supply voltage control circuit, comprising:
   (a) providing a control circuit comprising:
      (a1) a CPU control led between a sleep state and an operating state by the value of a stop-clock signal applied thereto, the CPU having power-supply terminals;
      (a2) a transistor inserted in parallel with said CPU across the power-supply terminals thereof; and
      (a3) an operational amplifier having an output terminal connected to the control terminal of said transistor and having, as inputs, a reference voltage and a voltage proportional to a current which flows into said transistor, said operational amplifier performing feedback control in such a manner that the current which flows into said transistor is rendered proportional to the reference voltage; and
      (a4) first and second switches serially inserted across the power-supply terminals and each having a control terminal connected to a current-value control terminal for being turned on and off by the value of a signal input to the current-value control terminal, wherein when one of said switches is turned on, the other is turned off;
   (b) wherein a node at which said first and second switches are connected together is connected to a diode which supplies a reference voltage via a time-constant circuit;
   (c) a potential at a node at which an output terminal of said time-constant circuit and said diode are connected together is supplied as a reference potential to a non-inverting input terminal of said operational amplifier;
   (d) terminal voltage of said diode is supplied as the reference voltage to said operational amplifier when said first switch is turned on and ground potential is supplied as the reference voltage to said operational amplifier when said second switch is turned on; and
   (e) said time-constant circuit has its time constant varied by a time-constant control signal input thereto from a time-constant control terminal;
   (f) said method further comprising:
      (f1) setting a value at the current-value control terminal so as to turn on said first switch and turn off said second switch before said CPU changes from the sleep state to the operating state, whereby a voltage at a reference-voltage input terminal of said operational amplifier is caused to rise via said time-constant circuit so that the current which flows into said transistor rises comparatively slowly as said voltage rises;
      (f2) changing over the time-constant control signal input to the time-constant control terminal to diminish the time constant of said time-constant circuit after the current which flows into said transistor attains a predetermined value; and
      (f3) under these conditions, changing over the current-value control signal in sync with a stop-clock signal that places said CPU in the operating state, thereby turning off said first switch and turning on said second switch, whereby the current which flows into said transistor is decreased as the current through said CPU increases.

18. The method according to claim 17, further comprising:
   (g) changing over the current-value control signal, in sync with a stop-clock signal that places said CPU in the sleep state, so as to turn on said first switch and turn off said second switch when said CPU is placed in the sleep state, whereby the current which flows into said transistor increases with a decrease in current through said CPU;
   (h) subsequently changing over the time-constant control signal to restore the original time constant; and
   (i) subsequently changing over the current-value control signal so as to turn on said second switch so that a voltage at a reference-voltage input terminal of said operational amplifier returns to ground potential comparatively slowly, whereby the current which flows into said transistor is decreased.

* * * * *